June 27, 1967   H. E. ROLFE, JR   3,327,647
FREIGHT BRACING MEANS
Filed June 17, 1965   5 Sheets-Sheet 1
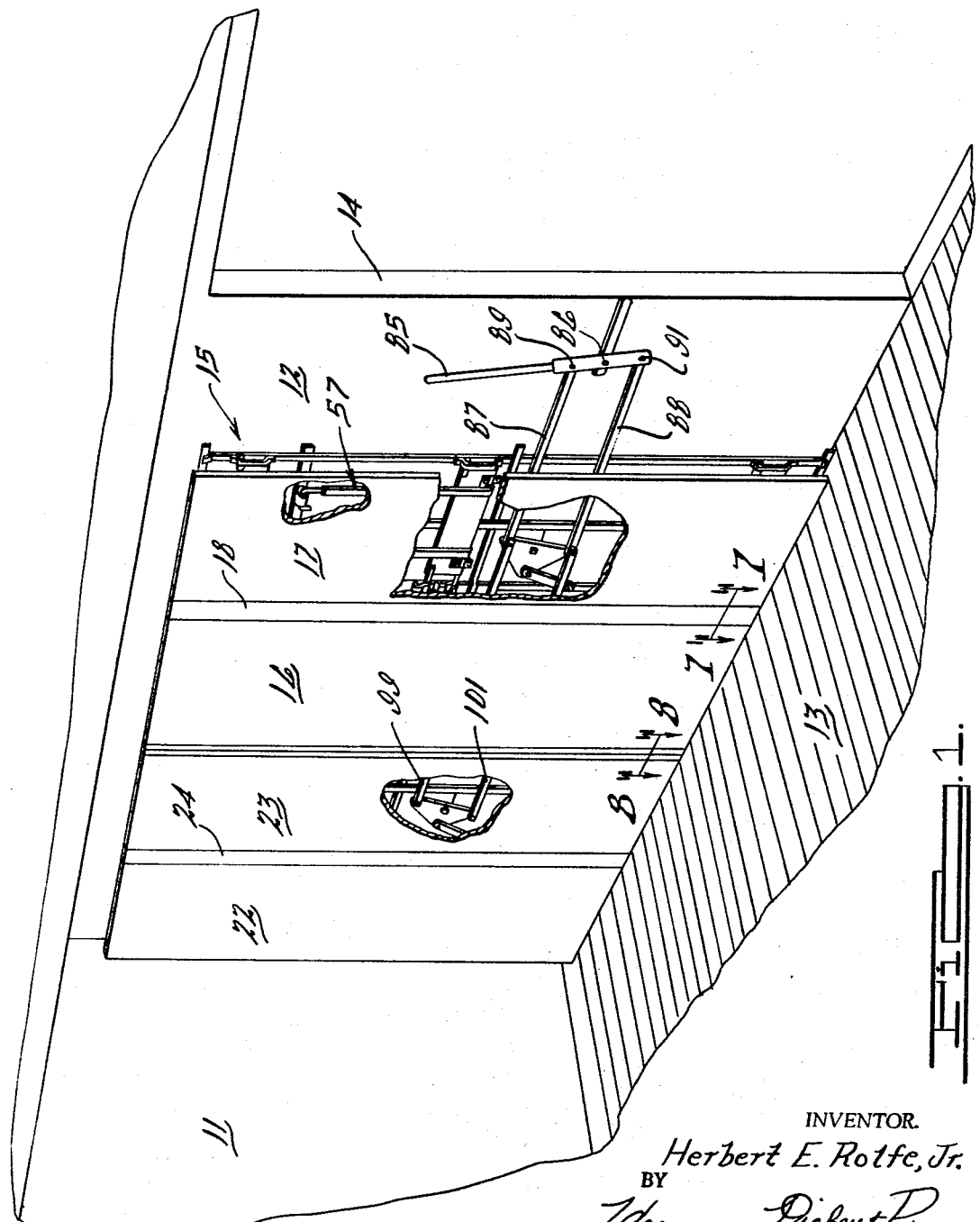
INVENTOR.
Herbert E. Rolfe, Jr.
BY
Carness, Dickey & Pierce.
ATTORNEYS.

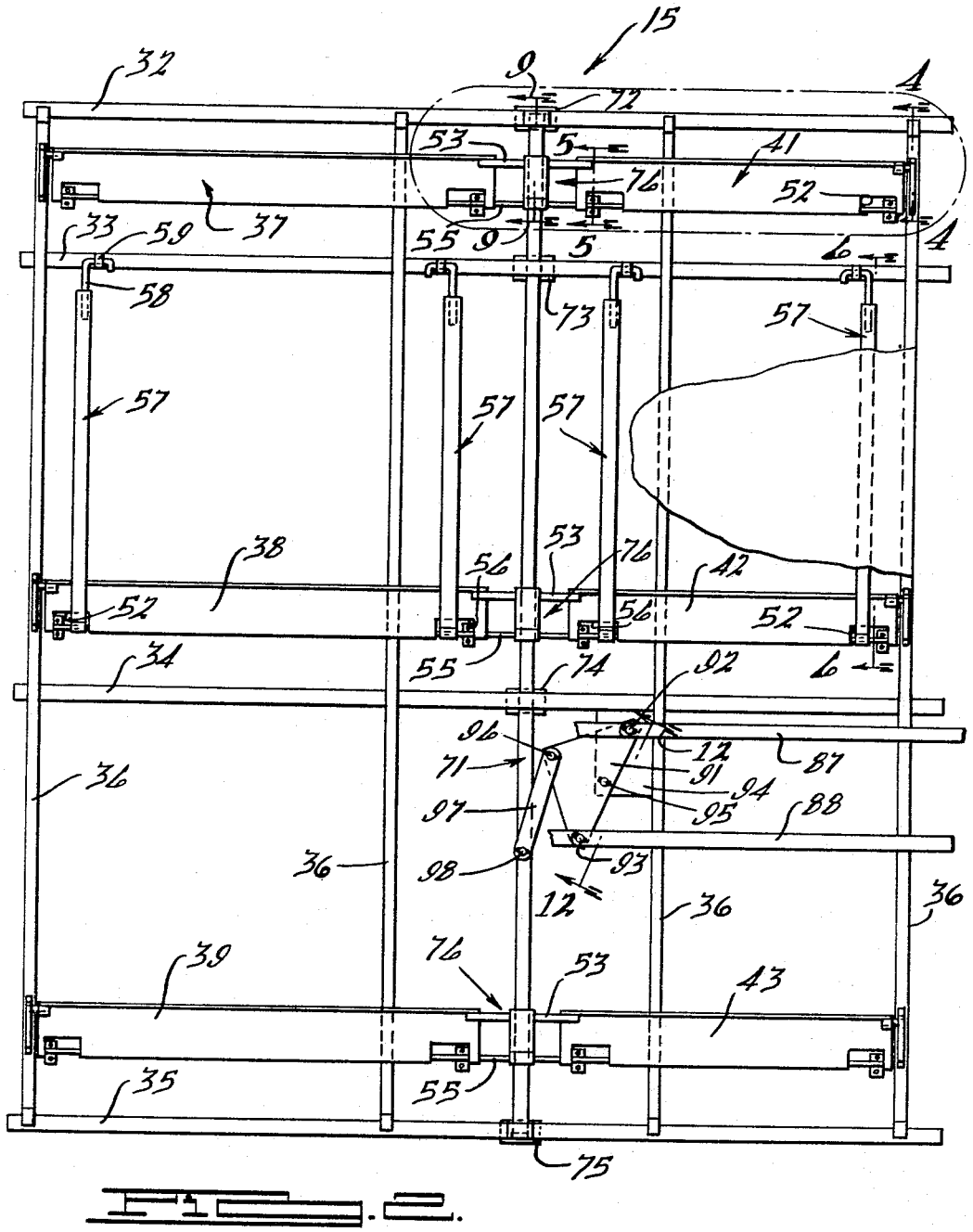

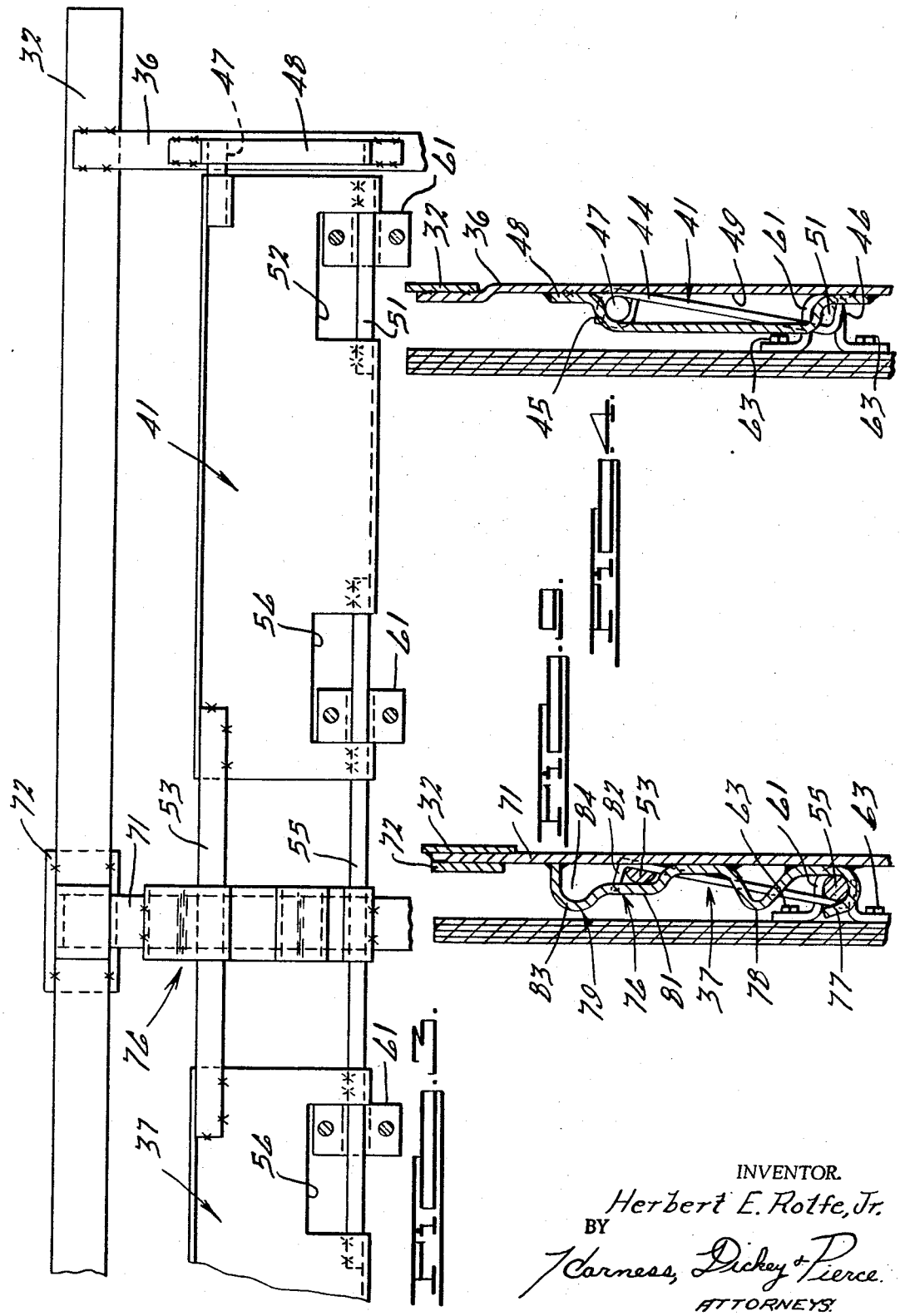

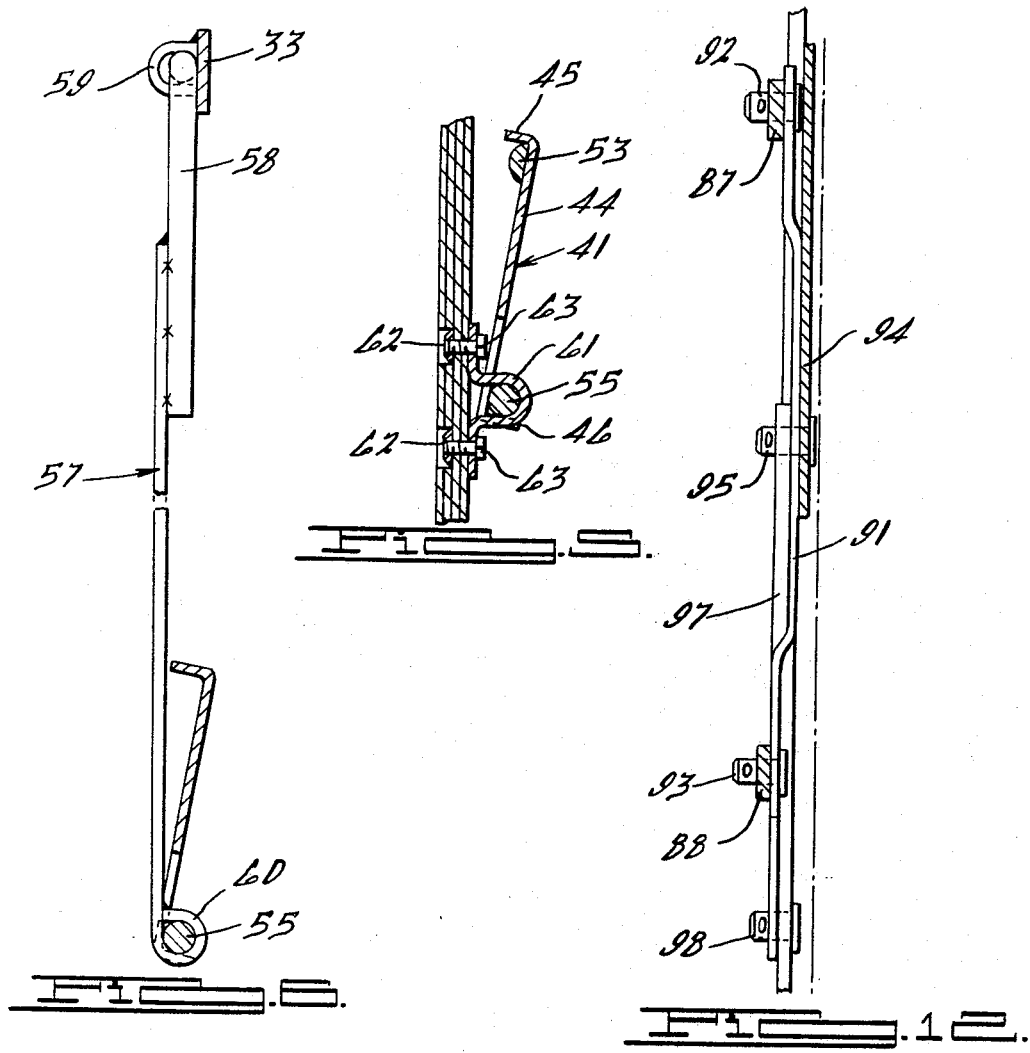
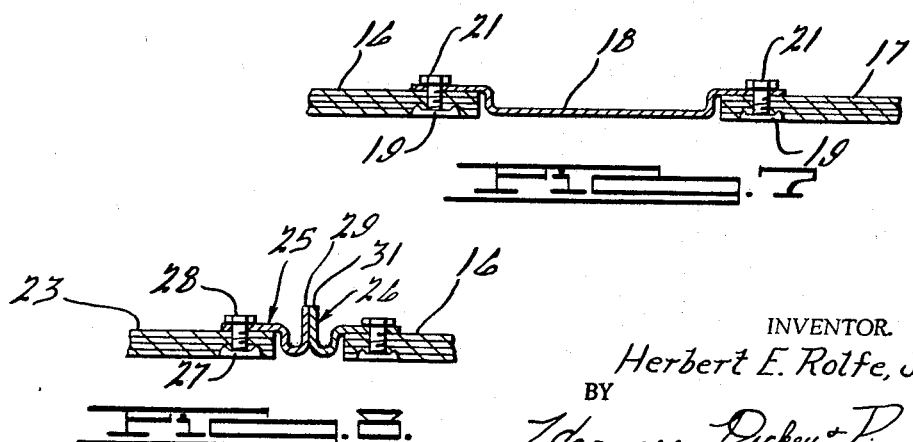

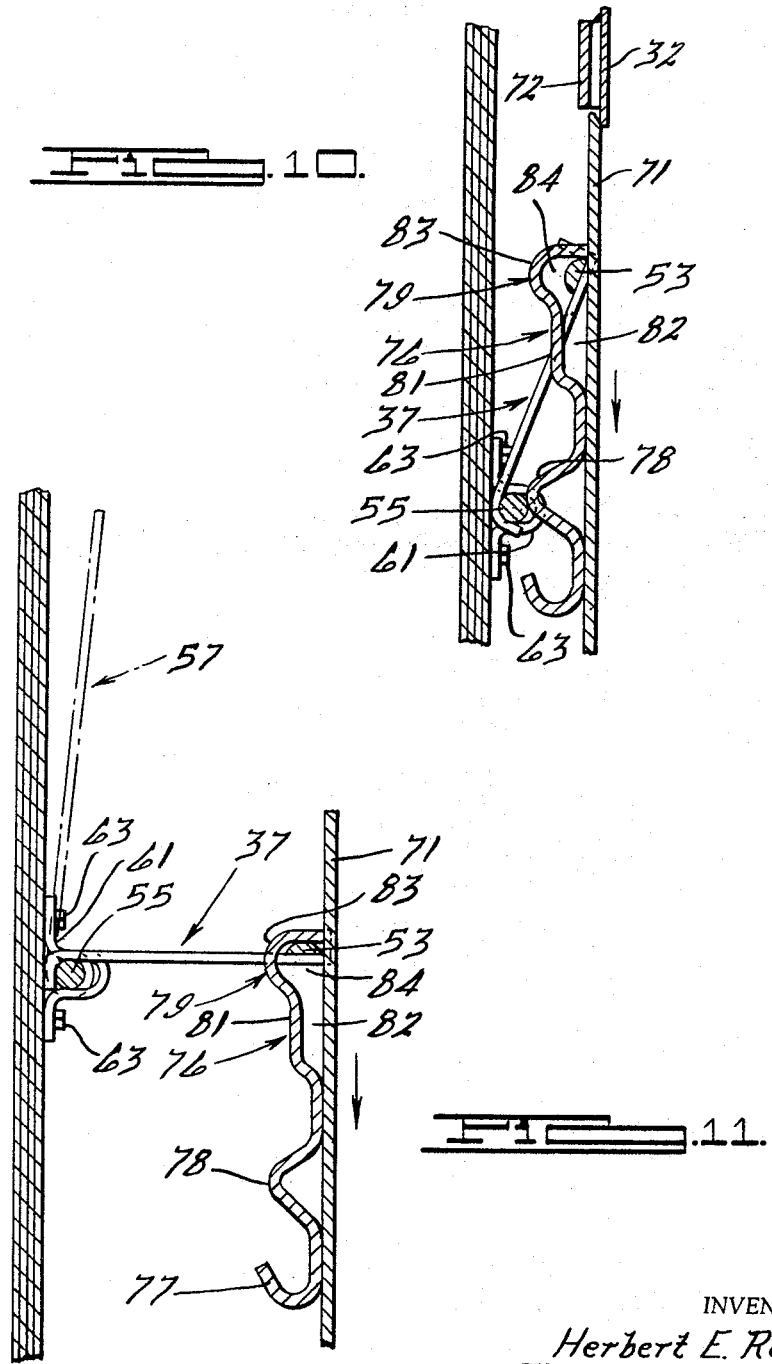

United States Patent Office 3,327,647
Patented June 27, 1967

3,327,647
FREIGHT BRACING MEANS
Herbert E. Rolfe, Jr., Garden City, Mich., assignor to Evans Products Company, a corporation of Delaware
Filed June 17, 1965, Ser. No. 464,642
20 Claims. (Cl. 105—369)

This invention relates to a freight bracing means for bracing freight within a storage area of a railway car or the like and more particularly to a sidewall filler panel assembly and improved latch and actuating mechanism therefor.

The use of sidewall filler panel assemblies to brace freight within a railway car or other moving vehicle when the freight does not extend completely between opposing walls of the vehicle is well known. Freight bracing devices of this type should normally include an actuating mechanism for moving the panel between its storage and its operative positions as well as some form of latch for retaining the panel at least in one of the positions. It is a principal object of this invention to provide an improved latching and actuating mechanism for a freight bracing panel of this type.

It is a further object of this invention to provide an improved means for supporting and moving the freight bracing panel from a storage postion to an operative position.

A freight bracing device embodying this invention comprises a freight bracing panel that is supported within a storage area of a railway car or the like defined by a plurality of walls. A hinge means is pivotally connected at one end thereof to the panel and is pivotally connected at its other end relative to one of the walls for movement of the freight bracing panel from a storage position adjacent the one wall to an operative position upon pivotal movement of the hinge means. Latch means retain the freight bracing panel in its storage position and release means are provided to release the latch means. The release means is coupled to the hinge means for pivoting the hinge means relative to the one wall and moving the panel from its storage to its operative position upon release of the latch means.

Other objects and advantages of this invention will become more apparent as this description proceeds, particularly when considered in conjunction with the accompanying drawings, wherein:

FIGURE 1 is a perspective view of a portion of a railway car embodying this invention;

FIGURE 2 is an enlarged elevational view of the freight bracing panel shown in FIGURE 1 with portions broken away to more clearly show the construction;

FIGURE 3 is an enlarged view of the encircled area shown in FIGURE 2;

FIGURE 4 is a cross-sectional view taken along the line 4—4 in FIGURE 2;

FIGURE 5 is an enlarged cross-sectional view taken along the line 5—5 of FIGURE 2;

FIGURE 6 is an enlarged cross-sectional view taken along the line 6—6 of FIGURE 2;

FIGURE 7 is an enlarged cross-sectional view taken along the line 7—7 of FIGURE 1;

FIGURE 8 is an enlarged cross-sectional view taken along the line 8—8 of FIGURE 1;

FIGURE 9 is an enlarged cross-sectional view taken along the line 9—9 of FIGURE 1;

FIGURES 10 and 11 are cross-sectional views, in part similar to FIGURE 9, showing the sequence of operation of the latching and actuating mechanism; and FIGURE 12 is a cross-sectional view taken along the line 12—12 of FIGURE 2.

Referring now in detail to the drawings and in particular to FIGURE 1, a railway car embodying this invention is illustrated partially and includes an end wall 11, a sidewall 12, and floor 13 which define, in part, a freight storage area. A doorway opening 14 is provided in the sidewall 12 for access to the storage area. In the event that freight does not extend completely between the sidewall 12 and a similar sidewall which opposes it, a freight bracing sidewall filler panel assembly, indicated generally by the reference numeral 15 and shown in more detail in the remaining figures, is provided to engage the sides of the freight and prevent its movement within a storage area during motion of the railway car. It is to be understood that sidewall filler panel assemblies may be positioned adjacent both opposing sidewalls.

The sidewall filler panel assembly 15 is made up of two like units. The first unit consists of plywood sheets 16 and 17 joined together adjacent their abutting faces and supported by a generally hat-shaped vertically extending structural member 18 (FIGURE 7). The adjacent edges of the panels 16 and 17 are secured to the extending legs of the hat-shaped member 18 by T-nuts 19 and bolts 21. The outer surface of the hat-shaped member 18 extends in substantially the same plane as the outer faces of the plywood panels 16 and 17 so that a uniform freight bracing area will be presented to the cargo within the storage area.

The second unit comprises a like pair of plywood panels 22 and 23 joined together adjacent each other by a hat-shaped member 24 (FIGURE 1). The adjacent edges of the panels 23 and 16 of each unit are fixed to structural members 25 and 26, respectively, by T-nuts 27 and bolts 28 (FIGURE 8). It will be noted that the structural members 25 and 26 have adjacent abutting legs 29 and 31 formed at the end of offset portions so that the sidewall filler panel assembly presents a substantially planar surface to the freight within the storage area.

The sidewall filler panel is supported by means of a frame assembly that is attached to the sidewall 12 in any suitable manner, or alternatively, may form a portion of the sidewall assembly. The supporting frame consists of horizontally extending strap members 32, 33, 34 and 35 which are joined by vertically extending strap members 36 (FIGURE 2). It is to be understood that the number of horizontal and vertical members may be altered depending upon the length and height of the storage area.

Each unit of the sidewall panel assembly 15 is supported for movement from a retracted storage position adjacent the sidewall 12 to an extended operative position by means of hinge members 37, 38, 39, 41, 42 and 43, which are positioned at vertically spaced locations along each side of the units of the sidewall filler panel assembly 15. The hinge members 37 and 41, 38 and 42, and 39 and 43 are interconnected together in a manner which will become more apparent as this description proceeds. Each of the hinge members 37 through 43 is substantially the same in construction and is formed of a Z-shaped member having a long leg 44 (FIGURES 4 and 5) that extends downwardly and outwardly from the sidewall 12 toward the plywood panels 16, 17, 22 and 23. A short leg 45 formed at the upper end of the long leg 42 extends outwardly from the sidewall 12 toward the plywood panels. A short leg 46 is formed at the lower end of the long leg 44 and extends inwardly toward the sidewall 12. At the outboard edge of each of the hinge members 37 through 43 and extending therefrom, a short pivot pin 47 is welded between the short leg 45 and the long leg 44 at their juncture. Each of the pivot pins 47 is constrained by a hat-shaped bracket 48 (FIGURES 3 and 4) that is welded to the respective vertical member 36 of the supporting frame assembly. The hat-shaped member 48 defines a longitudinally extending channel 49 in which the pivot pin 47 may slide and rotate.

A longer pivot pin 51 is welded to the outboard ends of each of the hinge members 37 through 43 adjacent the long leg 44 and the short leg 46. The pivot pins 51 extend into rectangular recesses 52 (FIGURE 3) formed at the outer end of each of the hinge members 37 through 41. The pivot pin 51 terminates at the outer face of each of the hinge members 37 through 43 so that it will not interfere with the hat-shaped bracket 48.

The inboard ends of adjacent pairs of hinges 37 and 41, 38 and 42, and 39 and 43, are interconnected at their upper ends by half round pivot pins 53 that have their flattened portions affixed, as by welding, to the long legs 44 of the hinge members 37 through 43 at the juncture between the legs 44 and 45. A longer completely round pivot pin 55 is welded to the lower ends of the adjacent pairs of hinge members 37 and 41, 38 and 42, and 39 and 43 at the juncture of the legs 44 and 46. The pivot pins 55 extend through rectangular apertures 56 which are formed in the hinge members 37 through 43 at their inboard ends (FIGURE 3).

A series of longer strap hinge assemblies 57 are positioned at spaced intervals along the sidewall filler panel assembly 15. Each of the strap hinge assemblies 57 has an L-shaped arm 58 affixed to its upper end. The horizontally extending portion of the L-shaped arm 58 is pivotally journaled within a bracket 59 (FIGURES 2 and 9) that is welded to the horizontally extending strap member 33 of the supporting frame assembly. The lower end of each strap hinge assembly 57 is formed with an arcuate portion 60 that is wrapped around the pivot pins 55 and 51 of the intermediate hinge members 38 and 42 within the recesses 56 and 52. Thus, the lower ends of the strap hinges 57 are pivotally journaled to the outboard pivot pins 51 and 55 of the hinge members 38 and 42.

The pivot pins 51 and 55 of each of the hinge members 38 through 43 are pivotally connected to the plywood panels 16, 17, 22 and 23 by means of U-shaped brackets 61 (FIGURES 4 and 5) which are affixed to the panel by T-nuts 62 and bolts 63.

A combined actuating and latch device is provided to move the sidewall filler assembly 15 from its retracted storage position adjacent the sidewall 12 to its operative position in engagement with cargo within the railway car storage area. This device includes a vertically extending actuating strap 71 (FIGURES 2 and 9–11) that is supported for sliding movement relative to the supporting frame assembly by U-shaped brackets 72, 73, 74 and 75 which are affixed to the horizontally extending strap members 32, 33, 34 and 35, respectively. Affixed to the actuating strap 71 are three identical actuating and locking members indicated generally by the reference numeral 76 and shown in more detail in FIGURE 9.

The members 76 are formed from sheet metal and consist of a lower hook-shaped latch portion 77, a V-shaped motion initiating portion 78 and a locking and actuating portion 79. The locking and actuating portions 79 consist of a first part 81 that defines a vertically extending slot 82 and a second part 83 that defines a generally cylindrical segment 84. The half round pivot pins 55 are received within the portion 79 and the slot 82 is equal in width to the radius of the half round pivot pin 53.

The vertically extending actuating strap 71 is slid by an actuating assembly comprised of an operating handle 85 that is supported upon a pivot pin 86 adjacent the doorway opening 14 (FIGURE 1). A pair of parallel links 87 and 88 are pivoted to the operating handle 85 above and below its pivotal support 86 by pivot pins 89 and 91, respectively. The inner ends of the parallel links 87 and 88 are pivotally connected to opposed vertices of a triangular shaped bellcrank 91 (FIGURES 2 and 12) by means of pivot pins 92 and 93. The bellcrank 91 is pivotally supported upon a bracket 94 of the supporting frame assembly by a pivot pin 95. The remaining vertex of the bellcrank 91 is connected, by means of a pivot pin 96, to one end of a link 97. The opposite end of the link 97 is connected to the vertically extending actuating strap 71 by a pivot pin 98. As has been noted, the panel frame assembly 15 is comprised of two sub-assemblies or units which are joined together. To insure smooth motion of the sidewall filler assembly 15, a similar actuating bellcrank and vertically extending strap assembly is provided for each unit (FIGURE 1). The bellcranks are connected for simultaneous movement by parallel links 99 and 101.

OPERATION

FIGURES 1 through 9 illustrate the sidewall filler panel assembly 15 in its storage position adjacent the car sidewall 12. In this position the hinge members 37 through 43 and the strap hinge assemblies 57 extend downwardly and outwardly from the wall. The vertically extending actuating strap 71 is in its uppermost position and the pivot pins 55 are received in the latching portion 77 and the half round pivot pins 53 are received within the restraining portion 82. It will thus be noted that the hinge members 37 through 43 are precluded from rotation and the sidewall filler assembly 15 will be restrained in its storage position.

If it is desired to extend the sidewall filler assembly 15, the operating handle 51 is rotated in a counterclockwise direction about its supporting pivot pin 86. This motion is transmitted through the parallel links 87 and 88 and 99 and 101 to counterclockwise rotation of the triangular bellcranks 91 about their supporting pivot pins 95. The link 97 thus urges the actuating strap assembly 71 in a downward direction. Initial downward movement of the actuating strap 71 causes the pivot pin 55 to be moved free of the restraining latch part 77. The half round pivot pin 55 also moves free of the restraining notch 82 and enters the circular cavity 84. Continued downward movement of the actuating strap 71 causes the lower surface of the V-shaped motion initiating portion 78 to contact the pivot pin 55 and urge it outwardly from the sidewall 12 (FIGURE 10). This action prevents any binding due to an overcenter action. Upon continued movement of the vertical actuating strap 71 in a downward direction, the portion 83 of the member 76 contacts the upper end of the half round pivot pins 53 and urges them downwardly. This movement and the overcenter relationship which has been established, causes the hinge members 37 through 43 to be rotated and urge the plywood panels 16, 17, 22 and 23 away from the sidewall 12 (FIGURE 11). The pivot pins 47 also rotate and slide within the brackets 48 during this movement. The strap hinges 57 also rotate during this motion to assist in supporting the weight of the extended panel assembly. When it is desired to return the extended panel to its storage position, the operating handle 85 is rotated in a clockwise direction about its pivot pin 86 and the opposite motion will be transmitted to the sidewall filler assembly.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:
1. A freight bracing apparatus for a railway car or the like having a plurality of walls defining a freight storage area comprising a freight bracing panel, hinge means pivotally connected at one end thereof to said panel, means for pivotally connecting the other end of said hinge means relative to one of the walls for movement of said freight bracing panel from a storage position adjacent the one wall to an operative position spaced from the one wall, latch means for retaining said freight bracing panel in its storage position, release means for releasing said latch means, and means coupling said release means to said hinge means for pivoting said hinge means relative to the one wall and moving said panel from its storage position to its operative position.

2. A freight bracing apparatus for a railway car or the like having a plurality of walls defining a freight storage area comprising a freight bracing panel, hinge means pivotally connected at one end thereof to said panel, means for pivotally and slidably connecting the other end of said hinge means relative to one of the walls for movement of said freight bracing panel from a storage position adjacent the one wall to an operative position spaced from the one wall, latch means for retaining said freight bracing panel in its storage position, release means for releasing said latch means, and means coupling said release means to said hinge means for pivoting and sliding said other end relative to the one wall for moving said panel from its storage to its operative position.

3. A freight bracing apparatus for a railway car or the like having a plurality of walls defining a storage area comprising a freight bracing panel, first hinge means pivotally connected at one end thereof to said freight bracing panel, means for pivotally connecting the other end of said first hinge means relative to one of the walls, second hinge means pivotally connected at one end thereof to said freight bracing panel, means for pivotally and slidably connecting the other end of said second hinge means relative to the one wall, latch means for retaining said freight bracing panel in its storage position, release means for releasing said latch means, and means coupling said release means to said second hinge means for pivoting said second hinge means relative to the one wall and moving said freight bracing panel from its storage position to its operative position.

4. A freight bracing apparatus for a railway car or the like having a plurality of walls defining a freight storage area comprising a freight bracing panel, first hinge means pivotally connected at one end thereof to said freight bracing panel, means for pivotally connecting the other end of said first hinge means relative to one of the walls, second hinge means pivotally connected at one end thereof to said freight bracing panel, means for pivotally and slidably connecting the other end of said second hinge means relative to the one wall, latch means cooperating with said second hinge means for retaining said freight bracing panel in a storage position adjacent the one wall, release means for releasing said latch means, and means coupling said release means to said second hinge means for pivoting said second hinge means relative to the one wall and moving said panel from said storage position to its operative position.

5. A freight bracing apparatus for a railway car or the like having a plurality of walls defining a freight storage area comprising a freight bracing panel, a hinge member having a first pivotal connection with said freight bracing panel, means providing a second pivotal connection between said hinge member and one of the walls for movement of said freight bracing panel, from a storage position adjacent the one wall to an operative position spaced from the one wall, an actuating member supported for movement relative to the one wall, said actuating member including a latch member adapted to coact with said first pivotal connection for retaining said freight bracing panel in its storage position, and means carried by said actuating member for rotating said second pivotal connection to move said freight bracing panel from its storage to its operative position.

6. A freight bracing apparatus for a railway car or the like having a plurality of walls defining a freight storage area comprising a freight bracing panel, hinge means pivotally connected at one end thereof to said freight bracing panel, means for pivotally connecting the other end of said hinge means relative to one of the walls, a hinge member having a first pivotal connection with said freight bracing panel, means providing a second pivotal connection between said hinge member and the one wall, an actuating member supported for movement relative to the one wall, said actuating member including a latch member adapted to coact with said first pivotal connection of said hinge member for retaining said freight bracing panel in a storage position adjacent the one wall, and means carried by said actuating member for rotating said second pivotal connection of said hinge member to move said freight bracing panel from said storage position to an operative position spaced from the one wall.

7. A freight bracing apparatus for a railway car or the like having a plurality of walls defining a freight storage area comprising a freight bracing panel, a hinge member having a first pivotal connection with said freight bracing panel, means providing a second pivotal connection between said hinge member and one of the walls for movement of said freight bracing panel from a storage position adjacent the one wall to an operative position spaced from the one wall upon pivotal movement of said hinge member, and an actuating member supported for movement relative to the one wall, said actuating member including latching means adapted to coact with said pivotal connections for retaining said freight bracing panel in its storage position, and means on said actuating member for releasing said latching means and for rotating said second pivotal connection to move said freight bracing panel from its storage position to its operative position.

8. A freight bracing apparatus for a railway car or the like having a plurality of walls defining a freight storage area comprising a freight bracing panel, a hinge member, a first pivot pin at one end of said hinge member, means pivotally connecting said first pivot pin to said freight bracing panel, a second pivot pin at the other end of said hinge member, means for pivotally and slidably connecting said second pivot pin relative to one of the walls for movement of said freight bracing panel from a storage position adjacent the one wall to an operative position spaced from the one wall, an actuating member supported by the one wall for vertical movement, a first latch member on said actuating member for coacting with said first pivot pin to retain said freight bracing panel in its storage position, a second latch member on said actuating member for cooperating with said second pivot pin to preclude rotation of said second pivot pin, and means on said actuating member for sliding and rotating said second pivot pin when said latch members are released from said pivot pins to move said freight bracing panel from its storage position to an operative position.

9. A freight bracing apparatus for a railway car or the like having a plurality of walls defining a freight storage area comprising a freight bracing panel, hinge means pivotally connected to said panel, means for pivotally connecting said hinge means to one of the walls, a hinge member, a first pivot pin at one end of said hinge member, means pivotally connecting said first pivot pin to said freight bracing panel, a second pivot pin at the other end of said hinge member, means for pivotally and slidably connecting said second pivot pin relative to the one wall for movement of said freight bracing panel from a storage position adjacent the one wall to an operative position spaced from the one wall, an actuating member supported by the one wall for vertical movement, a first latch member on said actuating member for coacting with said first pivot pin to retain said freight bracing panel in its storage position, a second latch member on said actuating member for cooperating with said second pivot pin to preclude rotation of said second pivot pin, and means on said actuating member for sliding and rotating said second pivot pin when said latch members are released from said pivot pins to move said freight bracing panel from its storage position to an operative position.

10. A freight bracing apparatus for a railway car or the like having a plurality of walls defining a freight storage area comprising a freight bracing panel, a hinge member, a first pivot pin at one end of said hinge member, means pivotally connecting said first pivot pin to said freight bracing panel, a second pivot pin at the other end of said hinge member, an actuating member supported by the one wall for vertical movement, a latch member on said actuating members for coating with said first pivot pin to retain said freight bracing panel in a storage position adjacent one of the walls, means on said actuating member for containing said second pivot pin, said last named means having a first portion for precluding rotation of said second pivot pin, a second portion for permitting rotation of said second pivot pin and means for sliding and rotating said second pivot pin when said latch member is released from said first pivot pin to move said freight bracing panel from its storage position to an operative position.

11. A freight bracing apparatus for a railway car or the like having a plurality of walls defining a freight storage area comprising a freight bracing panel, first hinge means pivotally connected at one end thereof to said freight bracing panel, means for pivotally connecting the other end of said first hinge means relative to one of the walls for supporting the freight bracing panel, second hinge means comprising a hinge member, a first pivot pin at one end of said hinge member, means pivotally connecting said first pivot pin to said freight bracing panel and a second pivot pin at the other end of said hinge member, an actuating member supported by the one wall for vertical movement, a latch member on said actuating member for coacting with said first pivot pin to retain said freight bracing panel in a storage position adjacent one of the walls, means on said actuating member for containing said second pivot pin, said last named means having a first portion for precluding rotation of said second pivot pin, a second portion for permitting rotation of said second pivot pin and means for sliding and rotating said second pivot pin when said latch member is released from said first pivot pin to move said freight bracing panel from its storage position to an operative position.

12. A freight bracing apparatus for a railway car or the like having a plurality of walls defining a freight storage area comprising a freight bracing panel, a hinge member, a half round pivot pin at one end of said hinge member, a round pivot pin at the other end of said hinge member, means pivotally connecting said round pivot pin to said freight bracing panel, an actuating and latching member supported by one wall of the freight storage area for movement with respect thereto, said member comprising a first latching portion having an open cavity adapted to receive said round pivot pin and being complementary in shape thereto, a second latching portion defining a latching recess adapted to receive said half round pivot pin, said second latching portion having opposing surfaces adapted to engage said half round pivot pin and being spaced at a lesser distance than the diameter of said half round pivot pin to affix it against rotation, said second latching portion terminating in a release portion defining a closed cavity adapted to receive said half round pivot pin, said closed cavity being sized to permit free rotation of said half round pivot pin, and means for moving said member between a latching position wherein said pivot pins are received within said latching portions to a second position wherein said half round pivot pin is received in said closed cavity and said round pivot pin is removed from the open cavity of said first latching portion.

13. A freight bracing apparatus for a railway car or the like having a plurality of walls defining a freight storage area comprising a freight bracing panel, a hinge member, a half round pivot pin at one end of said hinge member, a round pivot pin at the other end of said hinge member, means pivotally connecting said round pivot pin to said freight bracing panel, an actuating and latching member supported by one wall of the freight storage area for movement with respect thereto, said member comprising a first latching portion having an open cavity adapted to receive said round pivot pin and being complementary in shape thereto, a motion initiating portion having an inclined camming surface adapted to engage said round pivot pin and pivot said hinge member about said half round pivot pin and a second latching portion defining a latching recess adapted to receive said half round pivot pin, said second latching portion having opposing surfaces adapted to engage said half round pivot pin and being spaced at a lesser distance than the diameter of said half round pivot pin to affix it against rotation, said second latching portion terminating in a release portion defining a closed cavity adapted to receive said half round pivot pin, said closed cavity being sized to permit free rotation of said half round pivot pin and means for moving said member between a latching position wherein said pivot pins are received within said latching portions to a second position wherein said half round pivot pin is received in said closed cavity and said round pivot pin is removed from the open cavity of said first latching portion.

14. A freight bracing apparatus for a railway car or the like having a plurality of walls defining a freight storage area comprising a freight bracing panel, a hinge member, a half round pivot pin at one end of said hinge member, a round pivot pin at the other end of said hinge member, means pivotally connecting said round pivot pin to said freight bracing panel, an actuating and latching member supported by one wall of the freight storage area for vertical movement with respect thereto, said member comprising a first latching portion having an open cavity adapted to receive said round pivot pin and being complementary in shape thereto and a second latching portion vertically spaced from said first latching portion defining a latching recess adapted to receive said half round pivot pin, said second latching portion having opposing surfaces adapted to engage said half round pivot pin and being spaced at a lesser distance than the diameter of said half round pivot pin to affix it against rotation, said second latching portion terminating at one vertical end thereof in a release portion defining a closed cavity adapted to receive said half round pivot pin, said closed cavity being sized to permit free rotation of said half round pivot pin, and means for moving said member vertically between a latching position wherein said pivot pins are received within said latching portions to a second position wherein said half round pivot pin is received in said closed cavity and said round pivot pin is removed from the open cavity of said first latching portion.

15. A freight bracing apparatus for a railway car or the like having a plurality of walls defining a freight storage area comprising a freight bracing panel, a hinge member, a half round pivot pin at one end of said hinge member, a round pivot pin at the other end of said hinge member, means pivotally connecting said round pivot pin to said freight bracing panel, an actuating and latching member supported by one wall of the freight storage area for vertical movement with respect thereto, said member comprising a first latching portion having an open cavity adapted to receive said round pivot pin and being complementary in shape thereto, a motion initiating portion having an inclined camming surface adapted to engage said round pivot pin and pivot said hinge member about said half round pivot pin and a second latching portion vertically spaced from said first latching portion defining a latching recess adapted to receive said half round pivot pin, said second latching portion having opposing surfaces adapted to engage said half round pivot pin and being spaced at a lesser distance than the diameter of said half round pivot pin to affix it against rotation, said second latching portion terminating at one vertical end thereof in a release portion defining a closed cavity adapted to receive said half round pivot pin, said closed cavity being sized to permit free rotation of said half round pivot pin, said motion initiating portion being spaced vertically between said latching portions, and means for moving said member vertically between a latching position wherein said pivot pins are received within said latching portions to a second position wherein said half round pivot pin is received in said closed cavity and said round pivot pin is removed from the open cavity of said first latching portion and engaged by said motion initiating portion.

16. A locking member for a hinge having a half round pivot pin at one end thereof and a round pivot pin at the other end thereof comprising a first latching portion having an open cavity adapted to receive the round pivot pin and being complementary in shape thereto and a second latching portion defining a latching recess adapted to receive the half round pivot pin, said second latching portion having opposing surfaces adapted to engage the half round pivot pin and being spaced at a lesser distance than the diameter of the half round pivot pin to affix it against rotation, said second latching portion terminating in a release portion defining a closed cavity adapted to receive the half round pivot pin, said closed cavity being sized to permit free rotation of the half round pivot pin, and means for moving said member between a latching position wherein the pivot pins are received within said latching portions to a second position wherein the half round pivot pin is received in said closed cavity and the round pivot pin is removed from the open cavity of said first latching portion.

17. A locking member for a hinge having a half round pivot pin at one end thereof and a round pivot pin at the other end thereof comprising a first latching portion having an open cavity adapted to receive the round pivot pin and being complementary in shape thereto, a motion initiating portion having an inclined camming surface adapted to engage the round pivot pin and pivot said hinge member about the half round pivot pin and a second latching portion vertically spaced from said first latching portion defining a latching recess adapted to receive the half round pivot pin, said second latching portion having opposing surfaces adapted to engage the half round pivot pin and being spaced at a lesser distance than the diameter of the half round pivot pin to affix it against rotation, said second latching portion terminating at one vertical end thereof in a release portion defining a closed cavity adapted to receive the half round pivot pin, said closed cavity being sized to permit free rotation of the half round pivot pin, said motion initiating portion being spaced vertically between said latching portions, and means for moving said member vertically between a latching position wherein the pivot pins are received within said latching portions to a second position wherein the half round pivot pin is received in said closed cavity and the round pivot pin is removed from the open cavity of said first latching portion and adapted to be engaged by the motion initiating portion.

18. A freight bracing apparatus for a railway car or the like having a plurality of walls defining a freight storage area comprising a freight bracing panel, means for supporting said freight bracing panel for movement from a storage position to an operative position, a hinge member, a half round pivot pin at one end of said hinge member, a round pivot pin at the other end of said hinge member, means pivotally connecting said round pivot pin to said freight bracing panel, an actuating and latching member supported by one wall of the freight storage area for movement with respect thereto, said member comprising a first latching portion having an open cavity adapted to receive said round pivot pin and being complementary in shape thereto and a second latching portion defining a latching recess adapted to receive said half round pivot pin, said second latching portion having opposing surfaces adapted to engage said half round pivot pin and being spaced at a lesser distance than the diameter of said half round pivot pin to affix it against rotation, said second latching portion terminating in a release portion defining a closed cavity adapted to receive said half round pivot pin, said closed cavity being sized to permit free rotation of said half round pivot pin, and means for moving said member between a latching position wherein said pivot pins are received within said latching portions to a second position wherein said half round pivot pin is received in said closed cavity and said round pivot pin is removed from the open cavity of said first latching portion.

19. A freight bracing apparatus for a railway car or the like having a plurality of walls defining a freight storage area comprising a freight bracing panel, means for supporting said freight bracing panel for movement from a storage position to an operative position, a hinge member, a half round pivot pin at one end of said hinge member, a round pivot pin at the other end of said hinge member, means pivotally connecting said round pivot pin to said freight bracing panel, an actuating and latching member supported by one wall of the freight storage area for vertical movement with respect thereto, said member comprising a first latching portion having an open cavity adapted to receive said round pivot pin and being complementary in shape thereto, a motion initiating portion having an inclined camming surface adapted to engage said round pivot pin and pivot said hinge member about said half round pivot pin and a second latching portion vertically spaced from said first latching portion defining a latching recess adapted to receive said half round pivot pin, said second latching portion having opposing surfaces adapted to engage said half round pivot pin and being spaced at a lesser distance than the diameter of said half round pivot pin to affix it against rotation, said second latching portion terminating at one vertical end thereof in a release portion defining a closed cavity adapted to receive said half round pivot pin, said closed cavity being sized to permit free rotation of said half round pivot pin, said motion initiating portion being spaced vertically between said latching portions, and means for moving said member vertically between a latching position wherein said pivot pins are received within said latching portions to a second position wherein said half round pivot pin is received in said closed cavity and said round pivot pin is removed from the open cavity of said first latching portion and is engaged by said motion initiating portion.

20. A freight bracing apparatus for a railway car or the like having a plurality of walls defining a freight storage area comprising a freight bracing panel, a first hinge, means pivotally connecting one end of said first hinge to said freight bracing panel, means for connecting the other end of said first hinge to the railway car for supporting the freight bracing panel for movement from a storage position to an operative position, a hinge member, a half round pivot pin at one end of said hinge member, a round pivot pin at the other end of said hinge member, means pivotally connecting said round pivot pin to said freight bracing panel, an actuating and latching member supported by one wall of the freight storage area for vertical movement with respect thereto, said member comprising a first latching portion having an open cavity adapted to receive said round pivot pin and being complementary in shape thereto, a motion initiating portion having an inclined camming surface adapted to engage said round pivot pin and pivot said hinge member about said half round pivot pin and a second latching portion vertically spaced from said first latching portion defining a latching recess adapted to receive said half round pivot pin, said second latching portion having opposing surfaces adapted to engage said half round pivot pin and being spaced at a lesser distance than the diameter of said half round pivot pin to affix it against rotation, said second latching portion terminating at one vertical end thereof in a release portion defining a closed cavity adapted to receive said half round pivot pin, said closed cavity being sized to permit free rotation of said half round pivot pin, said motion initiating portion being spaced vertically between said latching portions, and means for moving said member vertically between a latching position wherein said pivot pins are received within said latching portions to a second position wherein said half round pivot pin is received in said closed cavity and said round pivot pin is removed from the open cavity of said first latching portion and is engaged by said motion initiating portion.

No references cited.

ARTHUR L. LA POINT, *Primary Examiner.*

D. E. HOFFMAN, *Assistant Examiner.*